US006157969A

United States Patent [19]

Müller

[11] Patent Number: 6,157,969

[45] Date of Patent: Dec. 5, 2000

[54] DEVICE FOR CONNECTING DMA REQUEST SIGNALS TO A SELECTED ONE OF DMA INPUT LINES

[75] Inventor: Thomas Müller, Wörth, Germany

[73] Assignee: Siemens AG, Munich, Germany

[21] Appl. No.: 09/091,197

[22] PCT Filed: Nov. 18, 1996

[86] PCT No.: PCT/DE96/02197

§ 371 Date: Jun. 10, 1998

§ 102(e) Date: Jun. 10, 1998

[87] PCT Pub. No.: WO97/22043

PCT Pub. Date: Jun. 19, 1997

[30] Foreign Application Priority Data

Dec. 13, 1995 [DE] Germany ........................... 295 19 804

[51] Int. Cl.[7] ............................. G06F 13/14; G06F 13/40

[52] U.S. Cl. .................................. 710/22; 710/3; 710/36; 710/38; 710/131; 710/132

[58] Field of Search .............................. 710/1, 22, 3, 36, 710/38, 131, 132

[56] References Cited

U.S. PATENT DOCUMENTS

| | | | |
|---|---|---|---|
| 4,286,319 | 8/1981 | Membrino et al. | 364/200 |
| 5,313,587 | 5/1994 | Patel | 395/275 |
| 5,604,739 | 2/1997 | Buhrgard et al. | 370/468 |
| 5,631,908 | 5/1997 | Saxe | 370/235 |
| 5,692,133 | 11/1997 | Abert et al. | 395/282 |
| 5,805,903 | 9/1998 | Elkhoury | 395/750.01 |
| 5,831,979 | 11/1998 | Byers | 370/360 |

FOREIGN PATENT DOCUMENTS

| | | |
|---|---|---|
| 351 961 | 1/1990 | European Pat. Off. . |
| WO 93/02420 | 2/1993 | WIPO . |

*Primary Examiner*—Thomas C. Lee
*Assistant Examiner*—Rehana Perveen
*Attorney, Agent, or Firm*—Kenyon & Kenyon

[57] ABSTRACT

A computer with module slots which can be connected to one another pith address lines, data lines and control lines, the control lines comprising DMA request lines, and with a DMA controller to which DMA request signals can be sent by plug-in functional units over the DMA request lines and setting means. The computer is provided with means to simplify a selection of DMA request lines for transmitting DMA request signals.

This may be used in personal computers and in automation computers.

5 Claims, 1 Drawing Sheet

DEVICE FOR CONNECTING DMA REQUEST SIGNALS TO A SELECTED ONE OF DMA INPUT LINES

FIELD OF THE INVENTION

The present invention relates to a computer with and more particularly, to a device for direct memory access requests.

BACKGROUND INFORMATION

Such a computer is known from Siemens Catalog IC 10, SICOMP Industrial Computer, 3/95 edition, describes a conventional computer where DMA request signals generated by plug-in functional units, e.g., in the form of data transmission modules, can be sent to a DMA controller of a motherboard over DMA request lines. To guarantee that the functional units can send their DMA request signals to the DMA controller over various DMA request lines (DMA channels), setting means in the form of coding switches are provided on these functional units. If the same DMA request line is inadvertently selected on two functional units for transmission of their DMA request signals, malfunctions occur in the computer because the DMA controller cannot recognize which functional unit has transmitted the DMA request signal.

SUMMARY OF THE INVENTION

The present invention relates to a computer including module slots connected to one another and coupled to address lines, data lines and control lines. The control lines include DMA request lines. The computer includes a DMA controller to which DMA request signals can be sent by plug-in functional units over the DMA request lines and setting means.

The object of the present invention is to simplify the selection of DMA request lines in a computer of the type mentioned above.

This object is achieved by

- providing the setting means with a DMA input and with a plurality of outputs,
- connecting a DMA request line to the DMA input of a setting means,
- connecting the DMA controller to the outputs of the setting means by output lines,
- setting the setting means so -hat the respective DMA inputs can be connected to their outputs.

Advantageous embodiments of the invention are derived from the subclaims.

The invention is based on the idea that n adjustable DMA channels of the plug-in cards car be connected to all DMA channels of a system bus as in a cross-bar distribution. A DMA channel that is not connected is switched with a high resistance, for which purpose a Fill-down resistor on the DMA controller generates a defined level.

DETAILED DESCRIPTION OF THE INVENTION

Figure 1:
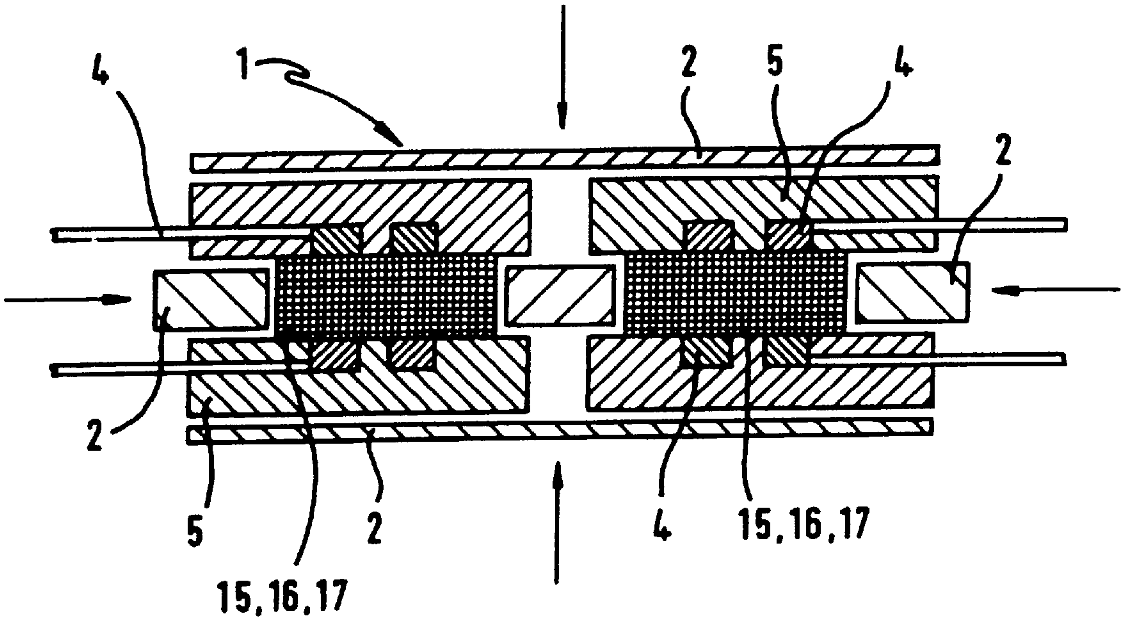
FIG. 1 shows components of a bus wiring in accordance with the present invention.

The invention is explained in greater detail below on the basis of an embodiment with reference to the only FIGURE in the drawing. The FIGURE in the drawing shows components of a bus wiring.

A system bus of a computer connects module slots which are each fitted with a functional unit and provided with a setting means, said bus comprising control lines 1, DMA request and acknowledgment lines 2*a*, 2*b* as well as address and data lines (not shown here). In the present example, m DMA request lines DRa, DRb, . . . DRm are provided for m module slots, with DMA request line DRa connected to the DMA input of a first setting means Ea, DMA request line DRb connected to DMA input of a second setting means Eb, and DMA request line DRm connected to DMA input of an $m^{th}$ setting means Em. Output lines DRQa, DRQb, . . . DRQm of setting means Ea, Eb, . . . Em, e.g., setting means in the form of multiplexers, are Interconnected as in a cross-bar distribution and lead to a DMA controller of a motherboard (not shown).

In the present example, it is assumed that three module slots are equipped with functional units, each of which is capable of activating DMA request lines DRa, DRb and DRm with a DMA request signal in the form of a level 1. During a computer parameterization run, parameterization program generates an identifier for each module slot and thus for each setting means Ea, Eb, . . . Em according to a user's specifications, said identifier indicating which of DMA request lines DRa, DRb, . . . DRm is to be activated for the respective junctional unit in the case of a DMA event. Furthermore, the parameterization program deposits these identifiers in registers assigned to the module slots. For the case when the identifiers for DMA request lines DRm, DRa and DRb are deposited for setting means Ea, Eb, . . . Em, a setting program, which may be part of the parameterization program, controls setting means Ea, Eb, . . . Em over respective control inputs 6, 7, 8 of these setting means Ea, Eb, . . . Em in such a way that setting means Ea connects DMA request line DRa to output line DRQm, setting means Eb connects DMA request line DRb to output line DRQa, and setting means Em connects DMA request line DRm to output line DRQb. For this purpose, the setting program first reads out the register, generates suitable control signals which are sent to control inputs 6, 7, 8 of setting means Ea, Eb, . . . Em, indicating to the latter which output line DRQa, DRQb, . . . DRQm is to be short-circuited to the respective DMA request line DRa, DRb, . . . DRm at the respective inputs of setting means Ea, Eb, . . . Em.

In accordance with the exemplary embodiment of the present invention, it is also possible to simplify the selection of DMA acknowledgment lines over which the DMA controller sends DMA acknowledgment signals to the functional units and over which the DMA controller indicates to these functional units that a DMA access is terminated. Additional setting means Fa, Fb, . . . Fm, at each of whose inputs one of DMA acknowledgment lines 2*b* is connected, are provided for this purpose. In the present example, DMA acknowledgment line DAa is connected to the input of setting means Fa, DMA acknowledgment line DAb is connected to the input of setting means Fb and DMA acknowledgment line DAm is connected to the input of setting means Fm. The parameterization and setting program controls setting means Fa, Fb, . . . Fm over control inputs 9, 10, 11 of said setting means Fa, Fb, . . . Fm according to the user's specifications, so that setting means Fa connects DMA acknowledgment line DAa to an output line DACKm, setting means Fb connects DMA acknowledgment line DAb to an output line DACKa, and setting means Fm connects DMA acknowledgment line DAm to an output line DACKb. For this purpose, the setting program again first reads out the identifiers deposited in the registers, generates suitable control signals which are sent back to control inputs 9, 10, 11 of setting means Fa, Fb, . . . Fm, indicating to the latter which output line DACKa, DACKb, . . . DACKm is to be short-circuited with the respective DMA acknowledgment line DAa, DAb, . . . DAm at the respective inputs of setting means Fa, Fb, . . . Fm.

What is claim is:

1. A computer device, comprising:

a plurality of module slots, each of the plurality or module slots coupled to others of the plurality of module slots via an address line, a data line, and at least one control line, each of the at least one control line including a respective DMA request line;

a plurality of plug-in functional units coupled to the plurality of module slots;

a DMA controller for receiving DMA request signals from the plurality of plug-in functional units; and a plurality of first setting arrangements, each of the plurality of first setting arrangements having a respective DMA input and a plurality of respective outputs, each respective DMA request line coupled to the respective DMA input of at least one of the plurality of first setting arrangements, the DMA controller being coupled to the plurality of respective outputs of the at least one of the plurality of first setting arrangements via a plurality of first lines, each of the plurality of first setting arrangements selectively coupling the respective DMA input to a selected one of the plurality of respective outputs.

2. The computer device according to claim 1, further comprising:

a plurality of DMA acknowledgment lines, the DMA controller transmitting acknowledgment signals on the plurality of DMA acknowledgment lines; and a plurality of second setting arrangements, each of the plurality of second setting arrangements having a respective acknowledgment input and a plurality of respective acknowledgment outputs, each of the plurality of DMA acknowledgment lines being coupled to the respective acknowledgment input of at least one of the plurality of second setting arrangements, the DMA controller being coupled to the plurality of respective acknowledgment outputs of the at least one of the plurality of second setting arrangements over a plurality of second lines, each of the plurality of second setting arrangements selectively coupling the respective DMA acknowledgment input; to one of the plurality of respective acknowledgment outputs.

3. The computer device according to claim 1, wherein a setting for the plurality of first setting arrangements is parameterized.

4. The computer device according to claim 1, wherein each of the plurality of first setting arrangements includes a multiplexer.

5. The computer device according to claim 1, wherein each of the plurality of first setting arrangements selectively couples the respective DMA input to any one of the plurality of respective outputs.

* * * * *

UNITED STATES PATENT AND TRADEMARK OFFICE

CERTIFICATE OF CORRECTION

PATENT NO. : 6,157,969
DATED : December 5, 2000
INVENTOR(S) : Thomas Müller

It is certified that error appears in the above-identified patent and that said Letters Patent is hereby corrected as shown below:

The title page should be deleted to appear as per attached title page.

The sheet of drawing consisting of FIG. 1, shoud be deleted to appear as attached sheet.

Signed and Sealed this

Fourth Day of December, 2001

Attest:

Nicholas P. Godici

NICHOLAS P. GODICI

*Attesting Officer* *Acting Director of the United States Patent and Trademark Office*

US006157969A

United States Patent [19]

Müller

[11] Patent Number: 6,157,969

[45] Date of Patent: Dec. 5, 2000

[54] DEVICE FOR CONNECTING DMA REQUEST SIGNALS TO A SELECTED ONE OF DMA INPUT LINES

[75] Inventor: Thomas Müller, Wörth, Germany

[73] Assignee: Siemens AG, Munich, Germany

[21] Appl. No.: 09/091,197

[22] PCT Filed: Nov. 18, 1996

[86] PCT No.: PCT/DE96/02197

§ 371 Date: Jun. 10, 1998

§ 102(e) Date: Jun. 10, 1998

[87] PCT Pub. No.: WO97/22043

PCT Pub. Date: Jun. 19, 1997

[30] Foreign Application Priority Data

Dec. 13, 1995 [DE] Germany .......................... 295 19 804

[51] Int. Cl.$^{7}$ .......................... G06F 13/14; G06F 13/40

[52] U.S. Cl. .................................. 710/22; 710/3; 710/36; 710/38; 710/131; 710/132

[58] Field of Search .............................. 710/1, 22, 3, 36, 710/38, 131, 132

[56] References Cited

U.S. PATENT DOCUMENTS 4,286,319 8/1981 Membrino et al. .................... 364/200
5,313,587 5/1994 Patel ........................................ 395/275
5,604,739 2/1997 Buhrgard et al. ........................ 370/468
5,631,908 5/1997 Saxe ......................................... 370/235
5,692,133 11/1997 Abert et al. ............................ 395/282
5,805,903 9/1998 Elkhoury ........................... 395/750.01
5,831,979 11/1998 Byers ..................................... 370/360

FOREIGN PATENT DOCUMENTS 351 961 1/1990 European Pat. Off. .
WO 93/02420 2/1993 WIPO .

*Primary Examiner*—Thomas C. Lee
*Assistant Examiner*—Rehana Perveen
*Attorney, Agent, or Firm*—Kenyon & Kenyon

[57] ABSTRACT

A computer with module slots which can be connected to one another pith address lines, data lines and control lines, the control lines comprising DMA request lines, and with a DMA controller to which DMA request signals can be sent by plug-in functional units over the DMA request lines and setting means. The computer is provided with means to simplify a selection of DMA request lines for transmitting DMA request signals.

This may be used in personal computers and in automation computers.

5 Claims, 1 Drawing Sheet

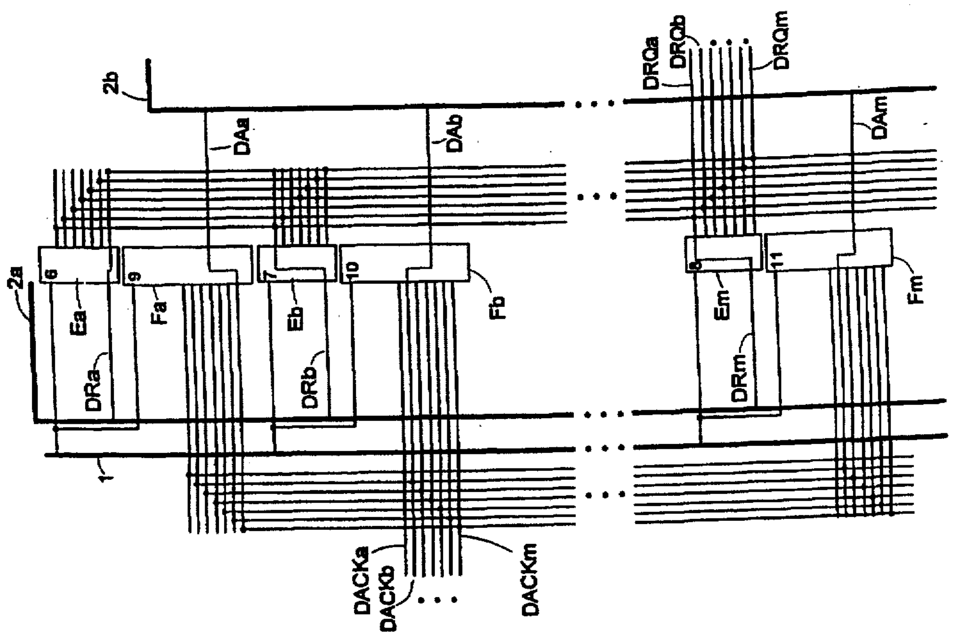

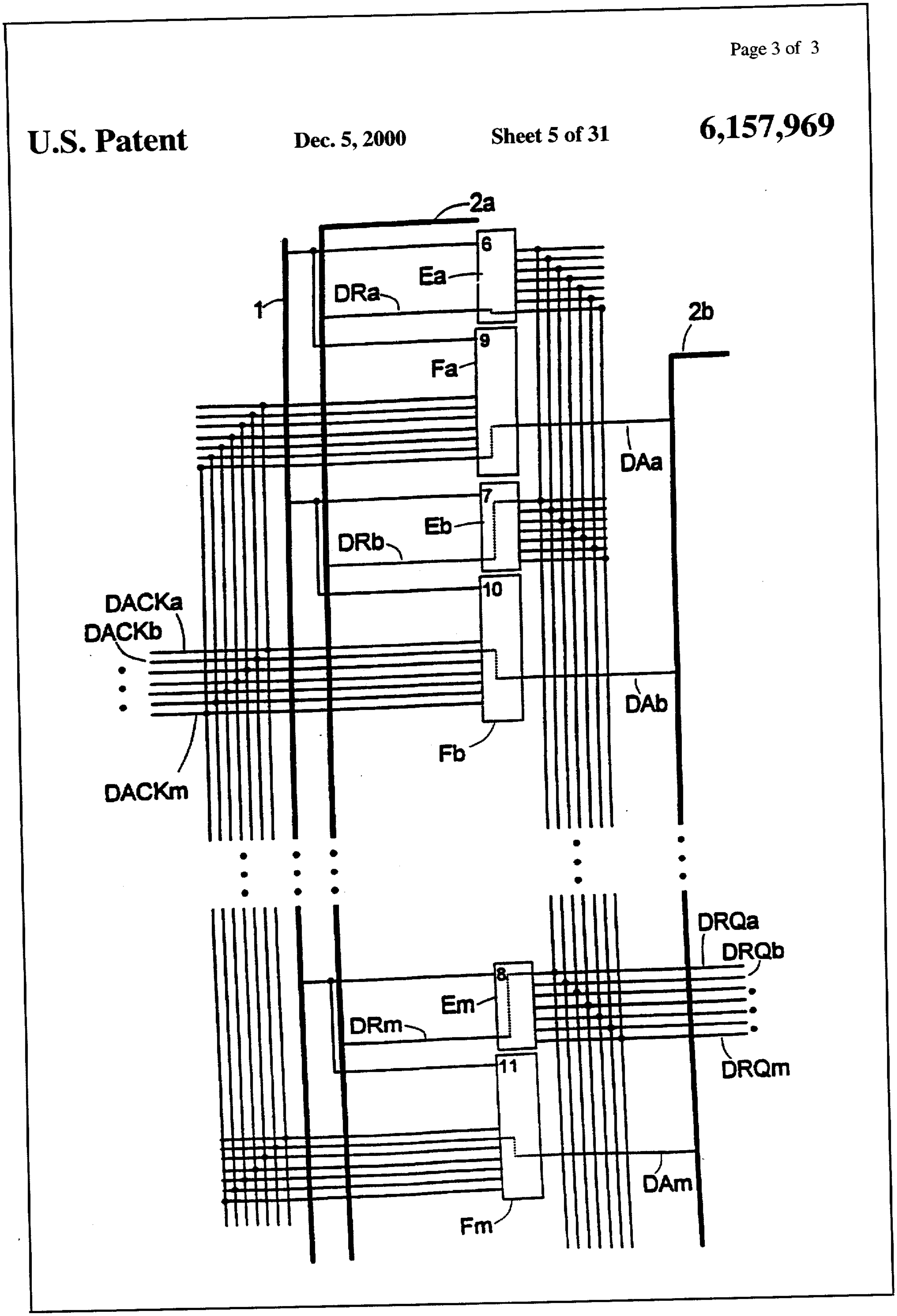
2a
6
Ea
DRa
1
9
Fa
2b
DAa
7
Eb
DRb
10
DACKa
DACKb
DAb
Fb
DACKm
DRQa
DRQb
8
Em
DRm
DRQm
11
DAm
Fm